July 3, 1956
P. M. MAZUR
2,752,640
SELF-FEEDING SILO
Filed Nov. 27, 1950
2 Sheets-Sheet 1
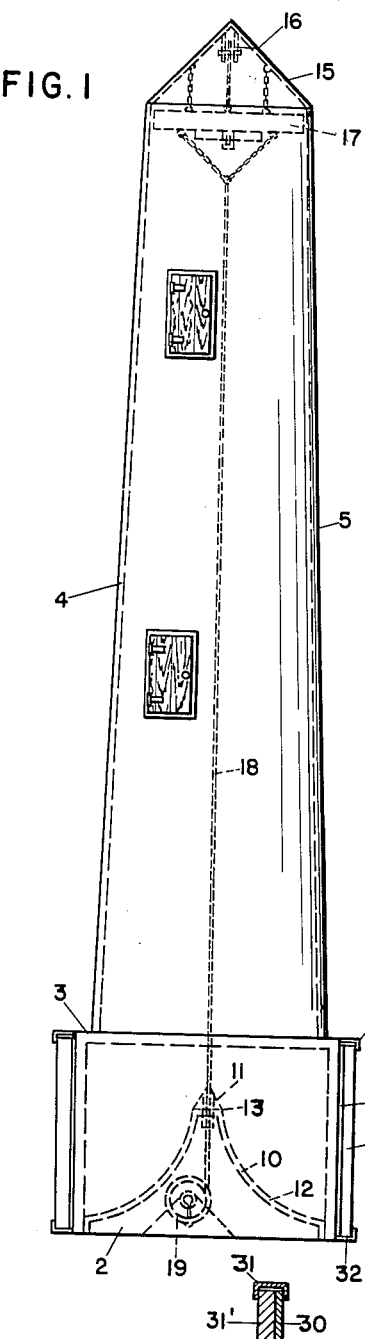
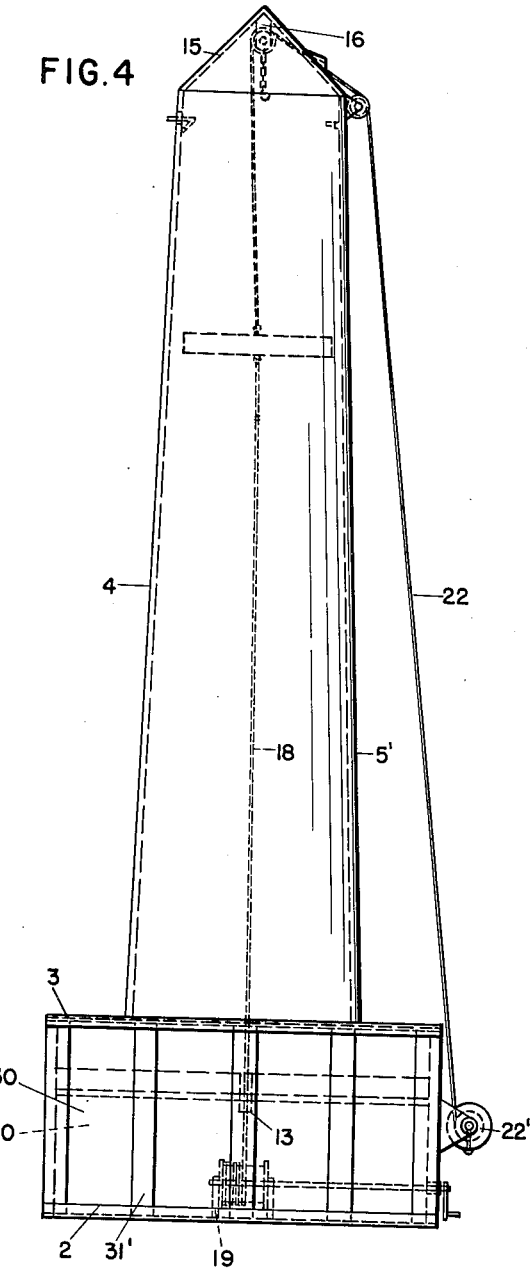
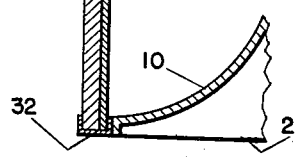
INVENTOR.
Paul M. Mazur
BY
Henri Ru
atty.

July 3, 1956
P. M. MAZUR
2,752,640
SELF-FEEDING SILO
Filed Nov. 27, 1950
2 Sheets-Sheet 2
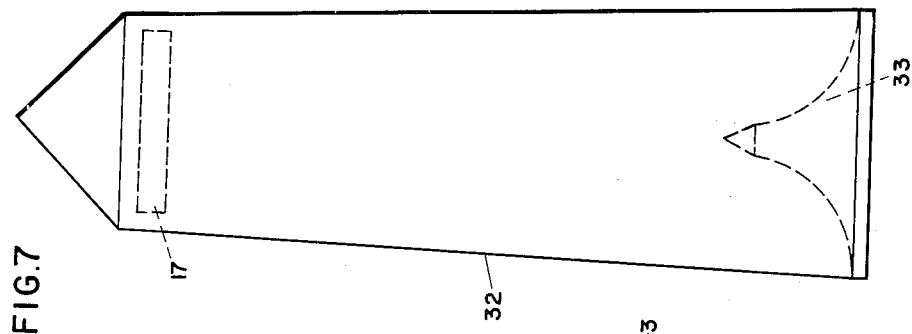
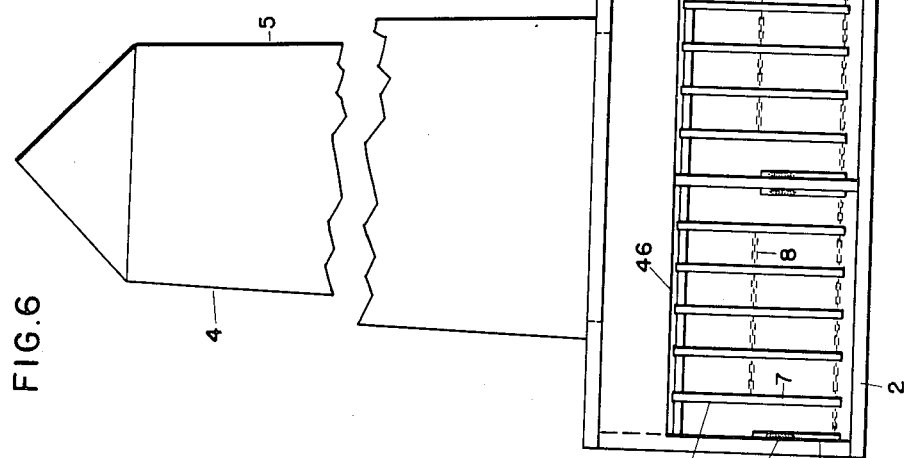
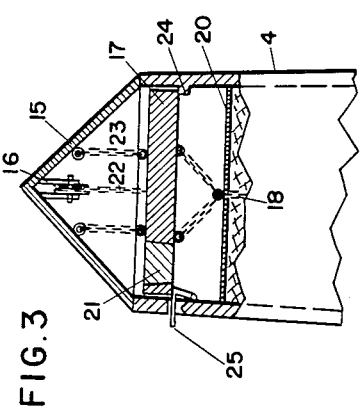
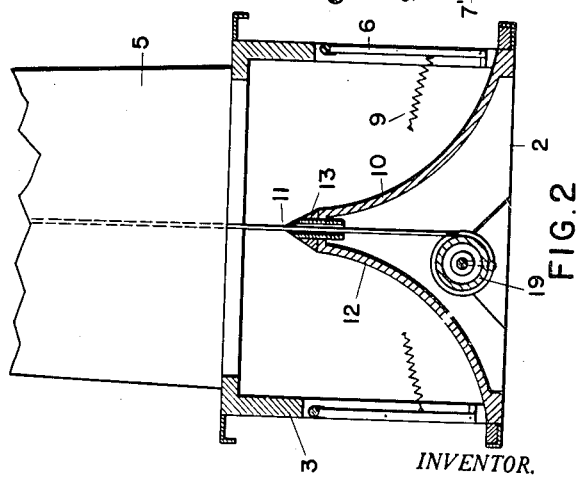
INVENTOR.
BY Paul M. Mazur
ATTY.

United States Patent Office 2,752,640
Patented July 3, 1956

2,752,640

SELF-FEEDING SILO

Paul M. Mazur, Titusville, N. J.

Application November 27, 1950, Serial No. 197,660

3 Claims. (Cl. 20—1.42)

This invention relates to silos and, more particularly, to silos provided with self-feeding gates which permit the animal to extend his muzzle therethrough to feed without danger of injury and in which the supply of silage available to the animal is automatically replenished as the animal eats away the silage within his reach.

Heretofore, the silo has been regarded merely as a place of storage for silage. In order to feed silage to the animals, it was necessary for a farmhand to pitchfork silage to the animals. This was necessary since no provision was made for automatically feeding the silage to the base of the silo within easy reach of the animal; it was deemed undesirable for an animal to extend his head within the silo since a heavy mass of silage falling on the head of the animal might seriously injure the animal.

The chief object of the present invention is to provide a self-feeding silo of economical construction which reduces greatly the cost of feeding silage to the animals.

An object of the present invention is to provide a self-feeding silo which is sealed to prevent spoilage of the silage and which is provided with a tamping member to tamp the silage in the storage chamber of the silo and to supply the silage automatically to the base of the silo as needed.

A further object is to provide a silo containing self-feeding gates and a member co-operating with the gates to direct silage thereto within the reach of the feeding animals so arranged as to prevent possibility of injury to the animal by masses of silage falling on the heads of the feeding animals or their heads being caught or jammed between the gates and such member.

A still further object is to provide a silo containing self-feeding gates in which the gates may be resiliently held in such manner as to prevent the feeding animals from pulling the gates outward and as to permit a mass of silage dropping in the storage chamber to force the gates outward to effect release of the silage thereby avoiding possible injury to the silo.

A still further object is to provide a self-feeding silo of novel construction which expedites formation of silage and permits its preservation in satisfactory condition as feed. Other objects of my invention will be readily perceived by reference to the following description.

This invention relates to a silo which comprises in combination a storage chamber for silage, a self-feeding gate in the storage chamber, and a member to direct silage toward the gate within the reach of a feeding animal. A tamping member is provided to pack the silage in the chamber. Mechanism is provided to move the tamping member toward silage in the chamber to pack the silage tightly therein. The tamping member may be sufficiently heavy in itself to pack the silage and in such case, the moving mechanism assists forces of gravity in tamping silage. Safety mechanism is provided to assure that the tamping mechanism does not fall inadvertently when the silo is empty. Preferably, sealing means are provided to seal silage in the chamber from ambient atmosphere thereby obviating or retarding spoilage.

The attached drawings illustrate a preferred embodiment of my invention, in which Figure 1 is a view in side elevation of the silo of my invention;

Figure 2 is a sectional view illustrating the dividing member;

Figure 3 is a sectional view illustrating the tamping member and safety mechanism;

Figure 4 is a view in front elevation of the silo shown in Figure 1;

Figure 5 is a sectional view taken on the line V—V of Figure 4;

Figure 6 is a view in front elevation of the silo shown in Figures 1 and 4 illustrating self-feeding gates in position to permit automatic animal feeding; and Figure 7 is a view in elevation of a modified silo.

Referring to the drawings, there is shown the self-feeding silo of my invention. The silo includes a concrete base or floor 2 covered with acid-resistant paint on which is placed a rectangular base portion 3 formed of concrete blocks. A hollow, cylindrical storage chamber 4 is mounted on base 3 and extends upward therefrom. The wall of chamber 4 is formed of wood and preferably is tapered as shown at 5 to assist in movement of silage downward in the chamber. This construction is desirable to prevent injury to the structure by acids of the silage. As a matter of fact, all bolts, for example, in the structure, which are exposed to silage, are countersunk and covered by a plastic, acid-resistant sealing compound. A drain (not shown) is provided in the floor of the silo to permit silage juices to escape.

The base 3 is provided on opposite sides with self-feeding muzzle gates 6 which are so designed as to permit a feeding animal to insert his muzzle between the bars 7 which are connected by chains 8 and supported from an overhead elevation 46 supported by base 3. Arresting elements 7' limit the height to which the bars may be raised. With this gate arrangement, the gate is, in effect, flexible in that portions thereof may be pushed in by individual animals reaching for silage behind different bars and makes it easier for different animals to reach different feeding areas at the same time. These gates are disclosed and claimed in co-pending application Serial No. 31,125, filed June 4, 1948, which was issued on January 27, 1953, as Patent No. 2,626,591. Gates of this type permit an animal to feed without danger of injury to him which might occur if the animal's head were inserted between bars 7 while feeding and a heavy mass of silage fell. Springs 9 are provided at opposite sides of each gate connecting the gates to base 3. These springs are of such tension as to prevent an animal pulling the gate outward while they are sufficiently weak as to permit a heavy mass of falling silage to force the gate outward thus preventing damage to the structure.

Extending across the base 3 centrally thereof is a hollow wood dividing member 10. Member 10 terminates in an upwardly extending knife edge 11 to separate the silage in substantially equal portions, the silage falling on the walls 12 which direct the silage toward gates 6. Walls 12 are so arranged as to co-operate with gates 6 to prevent a feeding animal inserting his head below the gate and between the gate and the wall 12 which might result in injury. While, as shown in Figure 3, walls 12 of member 10 are preferably curved to cooperate with gates 6, it will be understood satisfactory results are achieved even though such walls are substantially straight. A pipe 13 extends upward through member 10 and is substantially sealed with cotton waste and with oil soaked waste as a lubricant, as hereinafter described. If desired, chains or grating members (not shown) may be provided in base 3 to assure that large masses of silage do not fall toward the gates 6.

Such gratings are generally not necessary when the self-feeding muzzle gates of my invention are employed.

At the top of cylinder 4, rafters 15 are provided. If desired, a roof may be supported by the rafters although such roof is not essential. Rafters 15 support a pulley 16 for a purpose hereinafter described. A disk member 17 is supported adjacent the top of cylinder 14 and serves as a tamping member to tamp silage in place. The disk 17 is sufficiently heavy that it serves to pack silage tightly in the cylinder 4. To assist in packing the silage and to aid its downward movement, a cable 18 is fastened to the lower surface of disk 17. Cable 18 extends downward in cylinder 4 and passes through pipe 13, being lubricated by the oil soaked waste therein, to a winch 19. Winch 19 may be turned by hand or may be connected to a tractor if desired to pull disk 17 downward.

A gasket 20 which may be formed of several layers of roofing paper or building felt is disposed over silage in cylinder 4 between the silage and the disk. Gasket 20 seals the top of the silage against ambient atmosphere when the silo is filled and serves also to seal the sides and perimeter of the mass of silage after it has settled in cylinder 4.

While it will be understood the silo is usually filled through doorways in the wall of cylinder 4, I have found that it is desirable that a removable trap-door 21 be formed in disk 17 to permit filling if desired through the disk so as to increase the capacity of the silo. It will be appreciated trap-door 21 is fastened in place to prevent any possibility of forced removal from disk 17 when the disk is employed to tamp silage in place.

A chain or cable 22 is fastened to the upper side of disk 17 and passes upward and over pulley 16 extending downward without cylinder 4 being fastened in any suitable locking device 22' to prevent undesired downward movement of disk 17. If desired, removable chains 23 may also be employed to fasten disk 17 to rafters 15 to aid in preventing undesired downward movement of the disk. Preferably, additional safety mechanism may be provided. Such mechanism consists of a shelf 24 placed at one side of cylinder 4 on which the disk 17 rests and a flexible spring member 25 placed in the opposite side of cylinder 4. When disk 17 is below spring 25, upon its upward movement, it forces member 25 outwardly to permit the disk to pass it. When the disk has passed member 25, member 25 is retracted and forms a seat upon which the disk rests.

It will be understood gates 6 are not employed when the silo is being filled because access of air is permitted with resulting deleterious effects upon the walls of the silo due to acid formation and to the formation of air spaces within the silage preventing full capacity of the silo being utilized. To close the openings in base 3 at which gates 6 are placed when the silo is employed in feeding animals, I provide shield or bulkhead members 30. Shields 30 fit tightly within channel irons 31, 32 which extend across the top and bottom of the openings respectively. The shields 30 are backed up by a plurality of vertically extending supports 31' which fit securely in channel irons 31, 32 and are easily removed when it is desired to replace shields 30 by gates 6. The supports 31' assure that the mass of silage in the silo resting against the shields 30 does not destroy or bulge outward the shields while filling the silo and closes the silo securely until it is desired to use the silage in feeding.

In filling the silo, the disk is drawn to the top of cylinder 4 by means of chain 22 and is supported in such position by the safety mechanism. The shields 30 and supports 31' are placed to close base 4.

A mixture of cornmeal and grass is placed in cylinder 4 through doorways in the side thereof until about one-third of the cylinder is filled. The remainder of cylinder 4 is then filled with a mixture of molasses and grass until the cylinder is full. Disk 17 is released and winch 19 pulls it downward tamping the silage in place. The disk is then raised, the cylinder being again filled and the process is repeated until the cylinder 4 is full. If desired, some filling may be done through trap-door 21 to assure that the full capacity of the cylinder is utilized.

When it is desired to utilize the silage in automatic feeding, the supports 31' and shields 30 are removed and gates 6 fastened in position. An animal inserts his muzzle through the bars 7 of gate 6 but is unable to force his head between the bars. As the animal eats away silage, the weight of disk 17 continually forces silage downward against the edge 11 of member 10. Member 10 directs the silage toward gates 6 replenishing the supply within reach of the muzzle of the animal.

While I have described the gates 6 as being of the self-feeding muzzle type it will be understood that brisket gates may be employed if desired. If brisket gates are employed, it is necessary that grating chains or similar mechanism be placed in base 4 to prevent large, heavy masses of silage striking the head of the feeding animal which might result in serious injury.

In Figure 7, I have illustrated a modified form of silo. In this case, the silo 32 is cylindrical with a tapered wall, the base 3 being omitted. With such construction, the dividing member 33 may be in the form of a cone. I do not regard this construction as desirable as my preferred embodiment.

The present invention provides a self-feeding silo of economical design which reduces greatly the cost of feeding a herd of animals and assures better weight for market since the animals are free to eat at all times. In addition, it reduces the cost of feed since substantially none is wasted by trampling in mire. The percentage of silage spoilage is greatly reduced by the construction provided. The construction of my invention assures that the full capacity of the silo is utilized. Operation of the silo of my invention expedites operation of the farm since the time ordinarily spent in pitch-forking silage to the animals is saved thereby reducing operating costs.

While I have described a preferred embodiment of my invention, it will be understood my invention is not limited thereto since it may be otherwise embodied within the scope of the following claims.

I claim:
1. In a self-feeding silo, the combination of a base having openings therein, a trunco-conical storage chamber mounted on the base, a hollow, dividing member in the base to direct silage toward the openings, said member terminating in a knife-edge to separate the silage, a pipe extending vertically through the wall of the dividing member filled with sealing and lubricating material, a disk member in the storage chamber, means for moving the disk member to tamp silage in the chamber, a cable connecting the moving means and the disk member, the cable passing through the pipe, and a gasket member placed between the disk and silage in the storage chamber to seal the silage against ambient atmosphere.

2. In a self feeding silo, the combination of a base having openings therein, a trunco-conical storage chamber mounted on the base, a dividing member to direct silage toward the base openings, a disk member, means for moving the disk member to tamp silage in the chamber, a gasket member placed between the disk member and silage in the chamber to seal the silage against ambient atmosphere, a cable extending downwardly in the storage chamber and connecting the disk and the moving means, a second connecting member extending upwardly from the disk to secure the disk in raised position to permit filling the silo, a shelf adjacent the top of the storage chamber to receive the disk, the opposite side of the chamber being provided with a flexible spring support adapted to be moved outward to permit upward movement of the disk and serving as a seat to hold movement of the disk against downward movement and means to connect the disk to rafters of the storage chamber to further secure the same against downward movement.

3. In a self-feeding silo, the combination of a base having openings therein, a trunco-conical storage chamber mounted on the base, a dividing member to direct silage toward the base openings, said dividing member terminating in a knife edge to divide the silage, the walls of the member directing the silage toward the openings, a disk member, means for moving the disk member to tamp silage in the chamber, a gasket member placed between the disk member and silage in the chamber to seal the silage against ambient atmosphere, a cable extending downward in the storage chamber connecting the disk and the moving means, a pipe extending through the dividing member, said cable passing through the pipe, the pipe being filled with material to seal the same against ambient atmosphere, said material carrying the lubricant for the cable.

References Cited in the file of this patent

UNITED STATES PATENTS

| | | |
|---|---|---|
| 484,791 | Haifley | Oct. 25, 1892 |
| 519,094 | Roberts | May 1, 1894 |
| 925,400 | Trump | June 15, 1909 |
| 1,121,328 | Curtis | Dec. 15, 1914 |
| 1,155,189 | Adams | Sept. 28, 1915 |
| 1,234,709 | Adams | July 31, 1917 |
| 1,279,089 | Dolbear | Sept. 17, 1918 |
| 1,301,051 | Hart | Apr. 15, 1919 |
| 1,313,491 | Lazzell | Aug. 19, 1919 |
| 1,359,209 | Wadsworth | Nov. 16, 1920 |
| 1,366,052 | Bettenga | Jan. 18, 1921 |
| 1,367,900 | Usher | Feb. 8, 1921 |
| 1,377,036 | Wadsworth | May 3, 1921 |
| 1,448,226 | Mattson | Mar. 13, 1923 |
| 1,693,611 | Mabee | Dec. 4, 1928 |
| 1,693,612 | Mabee | Dec. 4, 1928 |
| 2,353,126 | Cecil | July 11, 1944 |
| 2,542,996 | Cordis | Feb. 27, 1951 |

FOREIGN PATENTS

| | | |
|---|---|---|
| 646,575 | France | July 16, 1928 |
| 315,654 | Great Britain | July 18, 1929 |
| 760,934 | France | Dec. 27, 1933 |
| 64,496 | Norway | Feb. 23, 1942 |

OTHER REFERENCES

Popular Science, January 1950, pages 124 and 125.